United States Patent
Fong et al.

(10) Patent No.: US 7,436,857 B2
(45) Date of Patent: Oct. 14, 2008

(54) MAPPING INFORMATION IN WIRELESS COMMUNICATIONS SYSTEMS

(75) Inventors: Mo-Han Fong, L'Orignal (CA); Hang Zhang, Nepean (CA); Geng Wu, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1206 days.

(21) Appl. No.: 10/179,283

(22) Filed: Jun. 26, 2002

(65) Prior Publication Data

US 2004/0013102 A1    Jan. 22, 2004

Related U.S. Application Data

(60) Provisional application No. 60/301,316, filed on Jun. 27, 2001, provisional application No. 60/311,971, filed on Aug. 13, 2001.

(51) Int. Cl.
*H04J 3/00* (2006.01)

(52) U.S. Cl. .............. 370/498; 370/474; 370/535; 370/541

(58) Field of Classification Search ........... 370/345, 370/341, 343, 344, 346, 347, 348, 349, 351, 370/353, 389, 392, 441, 442, 443, 464, 468, 370/469, 470, 471, 472, 474, 479, 498, 535, 370/541; 709/203, 217, 218, 219, 230, 236
See application file for complete search history.

(56) References Cited

U.S. PATENT DOCUMENTS

| | | | |
|---|---|---|---|
| 4,866,788 A | 9/1989 | Mouly et al. | 455/9 |
| 6,181,683 B1 * | 1/2001 | Chevillat et al. | 370/329 |
| 6,236,483 B1 * | 5/2001 | Dutt et al. | 398/141 |
| 6,414,938 B1 * | 7/2002 | Corke et al. | 370/231 |
| 6,542,490 B1 * | 4/2003 | Ahmadvand et al. | 370/338 |
| 6,606,311 B1 * | 8/2003 | Wang et al. | 370/338 |
| 6,614,775 B1 * | 9/2003 | Chang et al. | 370/341 |
| 6,654,363 B1 * | 11/2003 | Li et al. | 370/338 |
| 6,760,860 B1 * | 7/2004 | Fong et al. | 714/4 |
| 6,765,909 B1 * | 7/2004 | Sen et al. | 370/392 |
| 6,876,636 B2 * | 4/2005 | Sinnarajah et al. | 370/312 |
| 7,039,039 B2 * | 5/2006 | Cheong et al. | 370/349 |

* cited by examiner

*Primary Examiner*—Wing F. Chan
*Assistant Examiner*—Mark A. Mais

(57) ABSTRACT

A wireless communications system includes a shared TDM data channel for communications in different time slots with respective mobile stations (MSs), as well as dedicated channels. A first medium access control (MAC) multiplexing sublayer, provided in a base station controller, maps information of logical channels for communications services to the communications channels. A second MAC multiplexing sublayer maps information, mapped to the shared data channel in the first MAC multiplexing sublayer, to respective data units for communication in respective TDM time slots of the shared channel. The second MAC multiplexing sublayer handles scheduling, adaptive modulation and coding, and automatic retransmission of information on the shared data channel, as well as shared control channels for the shared data channel and channel quality feedback and data acknowledgement channels from the MSs.

23 Claims, 2 Drawing Sheets

MAPPING INFORMATION IN WIRELESS COMMUNICATIONS SYSTEMS

This application claims the benefit of U.S. Provisional Application No. 60/301,316 filed Jun. 27, 2001 and U.S. Provisional Application No. 60/311,971 filed Aug. 13, 2001, the entire contents and disclosure of each of which are hereby incorporated herein by reference.

BACKGROUND

This invention relates to mapping information in wireless communications systems or networks.

In order to improve efficiency for communications of data which is relatively insensitive to delay, e.g. packet data services, it has been proposed to use fast adaptive modulation and coding techniques and scheduling of data traffic on a high rate communications channel which may be shared by multiple users, such as a forward link from a base station to multiple mobile stations, in a known wireless communications system.

The adaptive modulation, coding, and scheduling can change as frequently as every time slot of the system (e.g. every 1.25 ms) to take advantage of varying channel conditions as well as the bursty nature of the packet data traffic. Thus the shared channel (SHCH), which is rate-controlled and for which fast cell or sector switching is provided rather than soft handoff, can have changes in modulation, coding, and scheduling or channel assignment to the users every time slot.

In addition to this fast adaptive modulation, coding, and scheduling to provide a shared data channel or "data pipe" to support packet data services, known wireless communications systems provide support for real-time circuit-oriented services, such as circuit-switched voice and circuit-switched data services, using dedicated channels. In contrast to a shared channel, a dedicated channel (DCH) is assigned or dedicated to a mobile station for a relatively long duration, typically a frame duration (e.g. 20 ms) or a multiple of the frame duration (e.g. 40 or 80 ms), has a relatively constant data rate with fixed modulation and coding, and is power-controlled with soft handoff supported.

Thus the dedicated channel and the shared channel are very different in their modes of operation.

In cdma2000 standards and known proposals, a "Mux and QoS Sublayer" within the OSI Layer 2 protocol stack is used to support resource management and multiplexing for different types of channel configurations. With such a structure, trying to meet the vastly different nature of the DCH and SHCH makes the design and implementation inefficient.

It is desirable to provide an improved arrangement which can facilitate resource management and multiplexing for such diverse channels in a wireless communications system.

SUMMARY OF THE INVENTION

According to one aspect of this invention there is provided a method of mapping information, in a wireless communications system, between logical channels for communications services and physical channels of the wireless communications system, the physical channels including at least one shared channel for communications with each of a plurality of terminals in a time division multiplexed (TDM) manner, and dedicated channels each assigned to a respective terminal for a relatively long period, the method comprising the steps of: for information of the logical channels relating to the dedicated channels, mapping the information between the logical channels and data units for communication on the respective dedicated channels in a first multiplexing sublayer of a medium access control (MAC) function; and for information of the logical channels relating to the shared channels, mapping the information between the logical channels and a shared transport channel in said first multiplexing sublayer of the MAC function, and mapping the information between the shared transport channel and the shared physical channel in a second multiplexing sublayer of the MAC function.

The step of mapping the information between the shared transport channel and the shared physical channel in the second multiplexing sublayer of the MAC function can comprise determining a size of a data unit for communication of said information on the shared physical channel, the method further comprising the step of segmenting and/or multiplexing said information in accordance with the determined data unit size. The step of segmenting and/or multiplexing said information can be carried out in the second multiplexing sublayer of the MAC function, or the determined data unit size can be communicated from the second multiplexing sublayer to the first multiplexing sublayer and the step of segmenting and/or multiplexing said information can be carried out in the first multiplexing sublayer of the MAC function.

The step of mapping the information in the second multiplexing sublayer of the MAC function preferably comprises scheduling said information for communication in respective TDM time slots with respective terminals.

According to another aspect the invention provides, in a wireless communications system providing a plurality of channels for communication of information on a forward link from at least one base station to a mobile station (MS), said channels including a time division multiplexed (TDM) packet data channel for communications in different TDM time slots with respective MSs whereby the channel is shared for a plurality of MSs, and channels for communication of information in a dedicated manner each to a MS assigned to the channel, a method of mapping information between logical channels for communications services and said communications channels, the method comprising the steps of: in a first medium access control (MAC) multiplexing sublayer, mapping information of the logical channels to the communications channels in accordance with the respective communications services of the logical channels; and in a second MAC multiplexing sublayer, mapping information, which is mapped to the shared packet data channel in the first MAC multiplexing sublayer, to respective data units for communication in respective TDM time slots of the packet data channel.

The step of mapping the information in the second multiplexing sublayer can comprise determining adaptive modulation and/or coding of said information in respective TDM time slots, in dependence upon channel quality feedback information from the respective terminals. It can also comprise automatic retransmission of said information in respective time slots in dependence upon acknowledgement information from the respective terminals.

The communications channels can include a shared control channel and the second MAC multiplexing sublayer can provide, in respective TDM time slots of the shared control channel, information for a respective terminal to decode said information in a corresponding TDM time slot of the shared data channel.

Conveniently the first MAC multiplexing sublayer is provided in a base station controller of the wireless communications system, and the second MAC multiplexing sublayer is provided in each of a plurality of base stations of the wireless communications system.

Another aspect of the invention provides a wireless communications system comprising a base station controller (BSC), a plurality of base stations (BSs) for communication with the BSC, and a plurality of terminals for communication with the BSs via wireless communications channels including a time division multiplexed (TDM) packet data channel for communications in different TDM time slots from a BS to respective terminals, and channels for communication of information from a BS in a dedicated manner each to a MS assigned to the channel, the system including apparatus for mapping information between logical channels for communications services and the wireless communications channels, the apparatus comprising a first medium access control (MAC) multiplexing function arranged to map information of the logical channels to the wireless communications channels in accordance with the respective communications services of the logical channels; and a second MAC multiplexing function arranged to map information, which is mapped to the TDM packet data channel in the first MAC multiplexing function, to respective data units for communication in respective TDM time slots of the packet data channel.

The invention further provides a base station arranged for operation in a wireless communications system as recited above.

BRIEF DESCRIPTION OF THE DRAWINGS

The invention will be further understood from the following description by way of example with reference to the accompanying drawings, in which.

DETAILED DESCRIPTION

Figure 1:
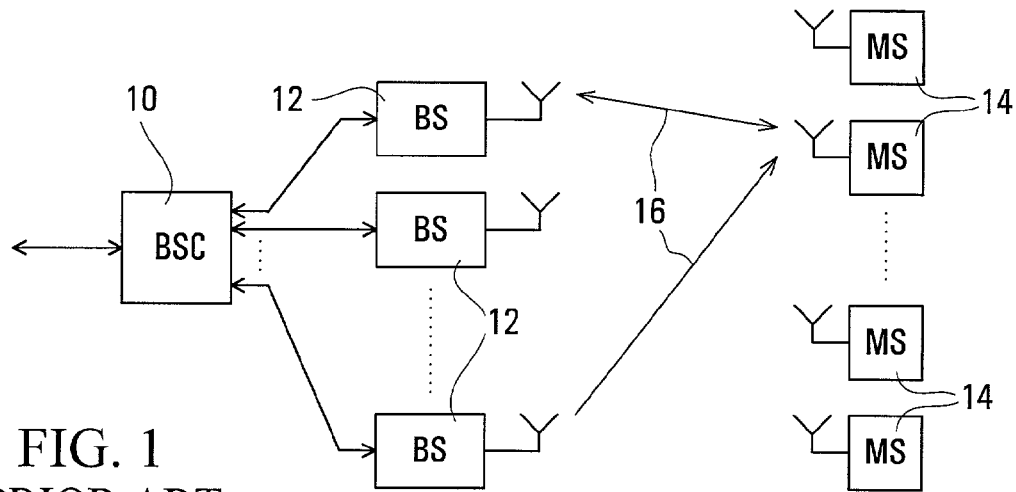
FIG. 1 schematically illustrates parts of a known wireless communications system.

Referring to FIG. 1, a known wireless communications system includes a base station controller (BSC) 10 which is coupled with each of a plurality of base stations (BSs) 12 for communications with mobile stations (MSs) 14 or other remote terminals via wireless communications links represented by arrowed lines 16. The wireless communications links comprise forward links from the BSs 12 to MSs 14, and reverse links from the MSs 14 to the BSs 12.

As is known, the wireless communications system of FIG. 1 desirably operates in accordance with an OSI layered structure or architecture. In such an architecture, Layer 1 constitutes a physical layer concerned with matters such as coding and modulation of physical communications channels, Layer 2 includes a medium access control (MAC) sublayer which is concerned with access between various communications services and the physical channels, and higher or upper layers are concerned with these communications services, such as signaling, voice services, and data services. The present invention is primarily concerned with the MAC sublayer.

Figure 2:
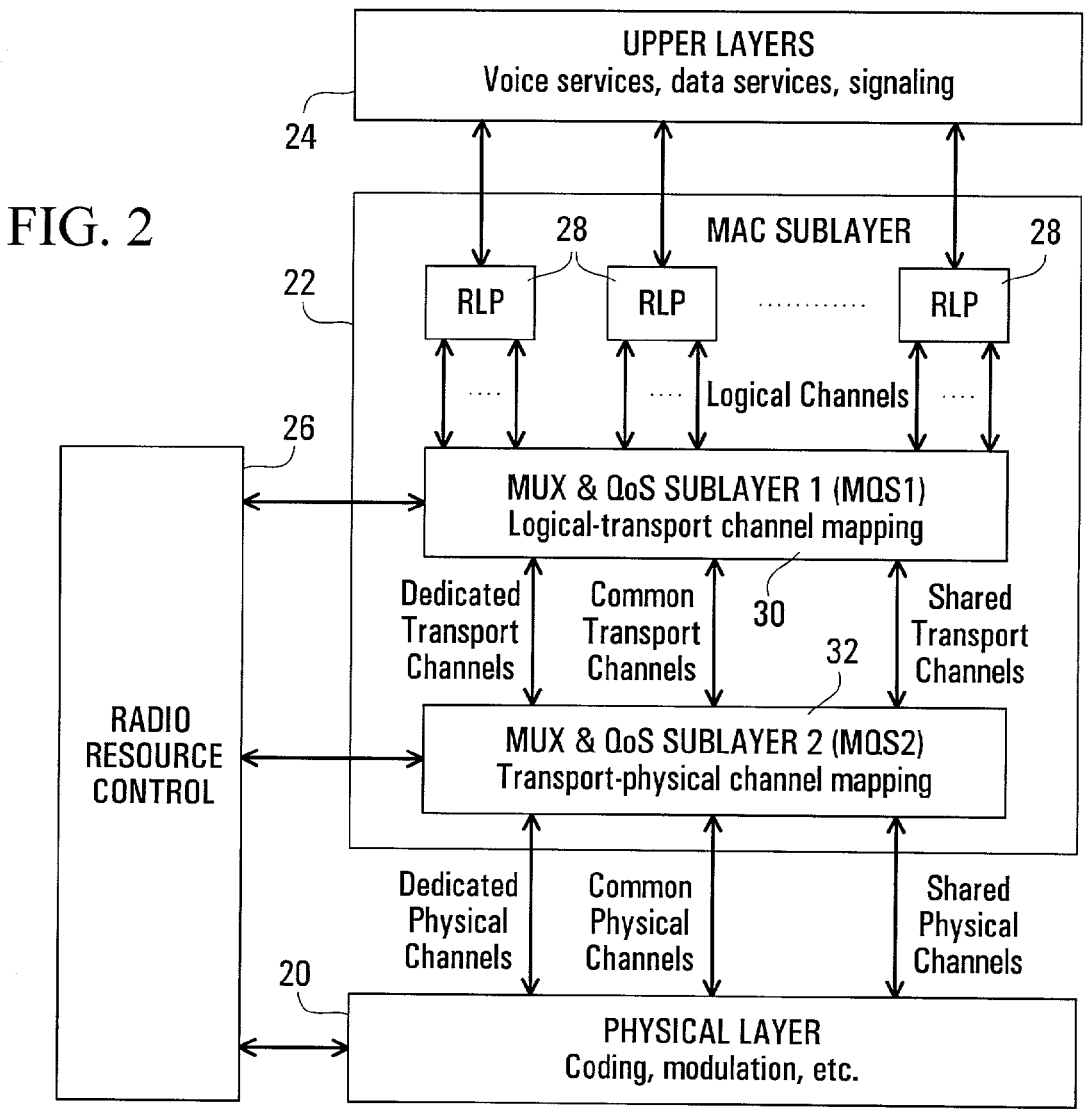
FIG. 2 illustrates parts of a functional architecture of a wireless communications system in accordance with an embodiment of the invention.

FIG. 2 illustrates parts of an architecture in accordance with an embodiment of the invention, the physical layer, MAC sublayer, and upper layers being represented by functional blocks 20, 22, and 24 respectively, and a radio resource control (RRC) function being represented by a functional block 26. The MAC sublayer 22 serves to provide access between communications services such as signalling, voice services, and data services of the upper layers 24 and the physical channels which are handled by the physical layer 20. These physical channels are represented in FIG. 2 as comprising dedicated physical channels, common physical channels, and shared physical channels, examples of which are discussed below, but it can be appreciated that the physical channels may include other physical channels and/or other types of physical channels.

It can be appreciated that this layered architecture applies for both directions of communication, for example, in the wireless communications system of FIG. 1, from the BSC 10 and/or the BSs 12 via the forward link to the MSs 14, and from the MSs 14 via the reverse link to the BSs 12 and/or the BSC 10. For simplicity and convenience, the following description refers only to communications in the forward or downlink direction from the BSC 10 to the MSs 14, but it can be appreciated that the same comments apply in respect of communications in the reverse or uplink direction from the MSs 14 towards the BSC 10.

Examples of forward link dedicated physical channels known in wireless communications systems include a forward fundamental channel (FCH or FFCH), a forward supplemental channel (SCH or FSCH), and a forward dedicated control channel (DCCH or FDCCH). Examples of forward link common physical channels known in wireless communications systems include a forward paging channel (F-PCH), a forward common control channel (CCCH or FCCCH), and a forward broadcast control channel (F-BCCH or BCCH). Examples of forward link shared physical channels known in wireless communications systems include a forward shared channel (FSHCH) and a forward shared control channel (FSHCCH), or a forward packet data channel (F-PDCH) and a forward packet data control channel (F-PDCCH). As indicated above, the physical layer 20 handles the coding and modulation of such channels in accordance with the resources allocated by the RRC 26, and also handles other physical layer functions such as HARQ (hybrid automatic retransmission, which combines stored soft decoded and/or demodulated information at the physical layer with Layer 2 retransmitted information).

The MAC sublayer 22 includes radio link protocol (RLP) functions 28 and a multiplexing (MUX) and quality-of-service (QoS) function which is described further below. The RLP functions 28 serve to translate between the communications services of the upper layers 24 and logical channels of the Mux and QoS function, and can implement a traditional Layer 2 ARQ (automatic retransmission) radio link protocol providing for simple error recovery.

Alternatively, the RLP functions 28 can implement a protocol providing improvements over the traditional RLP such as more efficient support for multiple QoS streams, improved data packet delivery in accordance with QoS streams, and dynamic Layer 2 to Layer 1 mapping for improved efficiency with adaptive modulation and coding techniques. Such an improved protocol can incorporate multiple RLP instances into a common QoS link protocol (QLP) entity, thereby also reducing complexity and resource management overhead. Such an improved protocol is described in U.S. Provisional Patent Application No. 60/293,469 filed May 23, 2001 in the names of Geng Wu et al. and entitled "QoS Link Protocol (QLP)".

In contrast to the prior art in which the Mux and QoS sublayer is a single layer within the Layer 2 protocol stack, in accordance with this invention the Mux and QoS sublayer is divided into two layers or parts, referred to as Mux and QoS sublayer 1 (MQS1), referenced 30 in FIG. 2, and Mux and QoS sublayer 2 (MQS2), referenced 32 in FIG. 2. A new class of channel, referred to as a transport channel, is defined between the MSQ1 and the MQS2. As illustrated in FIG. 2, there are three types of transport channel, namely dedicated transport channels, common transport channels, and shared transport channels, which in this embodiment of the invention generally correspond to the three types of physical channels described above, although this need not necessarily be the case. It can be appreciated that other types of transport channels, and mappings of transport channels to physical channels other than that described below, can be provided.

As shown in FIG. 2, the MQS1 30 provides a logical-transport channel mapping, i.e. a mapping between the logical channels communicated with the RLP functions 28 and the transport channels communicated with the MQS2. The MQS2 32 provides a transport-physical channel mapping, i.e. a mapping between the transport channels communicated with the MQS1 and the physical channels communicated with the physical layer 20.

Each transport channel type defines how information carried by the transport channel is communicated by the radio link. Each transport channel may, but need not necessarily be, mapped to a particular physical channel of the radio link. For example, a dedicated transport channel may carry information that is communicated on a particular dedicated physical channel. A common transport channel may carry information that is communicated on available common physical channels. A shared transport channel may carry information that is communicated on an available shared physical channel.

Conveniently, the transport-physical channel mapping provided by the MQS2 32 provides a one-to-one mapping or pass-through between the dedicated transport channels and the dedicated physical channels, and between the common transport channels and the common physical channels. In this case, the MQS1 30 can operate, for these physical channels, in the same manner as the known Mux and QoS function, and the MQS2 32 can be considered to be absent for these physical channels. Thus for example in this case, which is assumed for the following description, the MQS1 30 and MQS2 32 of the MAC sublayer 22 shown in FIG. 2 can be alternatively represented as shown in FIG. 3.

Figure 3:
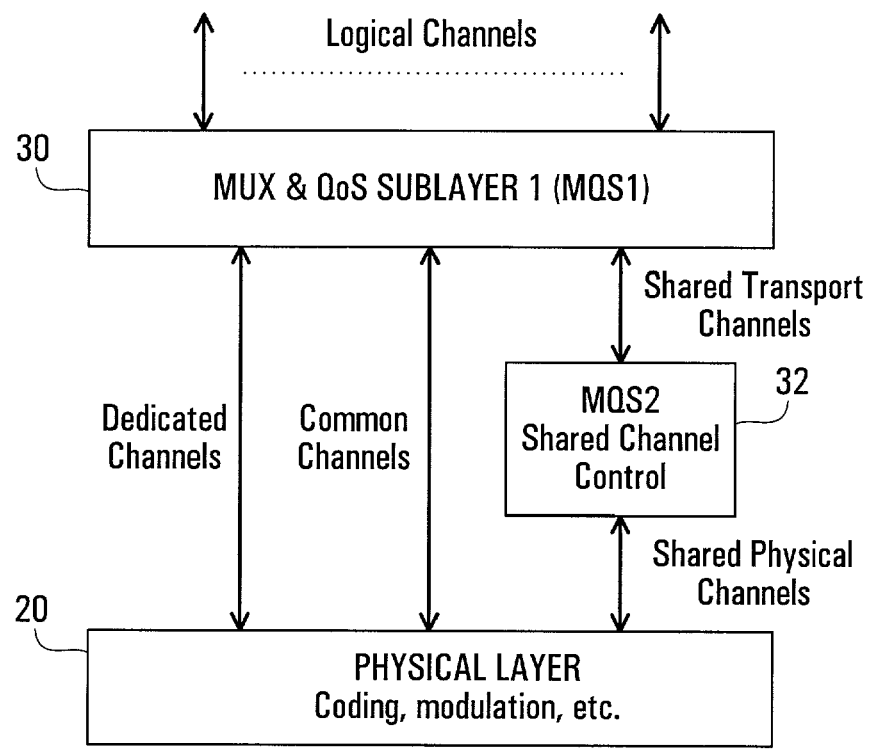
FIG. 3 is an alternative representation of part of the architecture of FIG. 2.

Referring to FIG. 3, the MQS1 30 and the logical channels via which this communicates with the RLP functions 28 (not shown in FIG. 3) are provided in a similar manner to that of FIG. 2. FIG. 3 also illustrates the physical layer 20 in the same manner as FIG. 2. In this case, the dedicated transport channels of the MQS1 30 are the same as the dedicated physical channels of the physical layer 20, i.e. these dedicated channels pass directly through the MQS2 32 of FIG. 2, and accordingly are shown in FIG. 3 as dedicated channels communicated directly between the MQS1 30 and the physical layer 20. The same applies in this example for the common transport channels, which are the same as the common physical channels, and these accordingly are shown in FIG. 3 as common channels communicated directly between the MQS1 30 and the physical layer 20.

Thus as shown in FIG. 3 the MQS2 32 only functions between the shared transport channels of the MQS1 30 and the shared physical channels of the physical layer 20, and in this example can be considered to be a shared channel control function because it is only concerned with the shared channels.

In an embodiment of the invention, the MQS1 30 operates as indicated above to map the logical channels to the different transport channel types. For example, a real-time (not tolerant to delays) circuit-switched service such as a voice service is mapped to the dedicated transport channels, and a delay tolerant packet service such as WWW (world-wide web, or Internet communications) is mapped to the shared transport channels.

In addition, the MQS1 30, which is designed for backwards compatibility with the known cdma2000 Mux and QoS Sublayer, supports interface primitives with the MQS2 32, soft hand-off (SHO) multicasting operations for dedicated channels, and bulk QLP protocol data unit (PDU) multicasting for shared channels. To facilitate such multicasting operations, the MQS1 is conveniently implemented as a centralized layer within the BSC 10 of FIG. 1, but it could alternatively be implemented in a distributed manner among the BSs 12. For example, to avoid delays for communications via a shared channel, the BSC 10 can send the BSs 12 data for multiple scheduler transmissions at the time slot rate of 1.25 ms, this bulk data being buffered in the BSs 12.

In such an embodiment of the invention, the MQS2 32 operates to support the fast scheduling of communications via shared channels, for example mapping protocol data units (PDUs) of the shared transport channel to appropriate physical channel(s), on one or more carriers, based on QoS, terminal (MS) capability, and system capacity optimization. To this end the MQS2 32 constructs MAC data units, as described further below, by segmentation or multiplexing of QLP or RLP PDUs based on the physical layer data unit size. The MQS2 32 can also provide support for grouping and/or switching of carriers for multi-carrier operation, and real-time QoS control, for example using HARQ as described above and controlling, for different applications, requirements for parameters such as target frame error rate (FER), delay, delay jitter, and QoS. In addition, the MQS2 32 can support a flow control mechanism and interface primitives with the MQS1 30.

The MQS2 32 is conveniently implemented as a distributed layer in each BS 12 of FIG. 1, and as indicated above can be a pass-through for dedicated and/or common channels.

It can be appreciated from the above description that in embodiments of this invention the different modes of operation of dedicated (or common) and shared physical channels are accommodated by the two different Mux and QoS sublayers, the MQS1 30 operating in a generally conventional manner for the dedicated channels with relatively constant data rate, fixed modulation and coding, relatively long assignments to MSs 14, and support for SHO, whereas the MQS2 32 operates to support the fast (per time slot) scheduling, rate control, and adaptive modulation and/or coding required for shared (data and/or control) channels. Thus embodiments of the invention provide two different resource management and multiplexing processes, respectively for relatively slow, time-driven, dedicated channel operation for example for real-time circuit-oriented services, and relatively fast, scheduling-driven, shared channel operation for example for packet data services.

The interface primitives referred to above between the MQS1 30 and the MQS2 32, and primitives between these and other functions such as the physical layer 20 and the RLP functions 28, serve among other things to provide and control the flow of data between these functions. For communications via shared channels, the MQS2 32 operates to segment and/or multiplex data packets supplied via the MQS1 30 to form data units appropriate for the shared physical channels, in accordance with the fast scheduling of data on the shared channels. Such packet segmentation and multiplexing in accordance with an embodiment of the invention is illustrated in FIG. 4.

Figure 4:
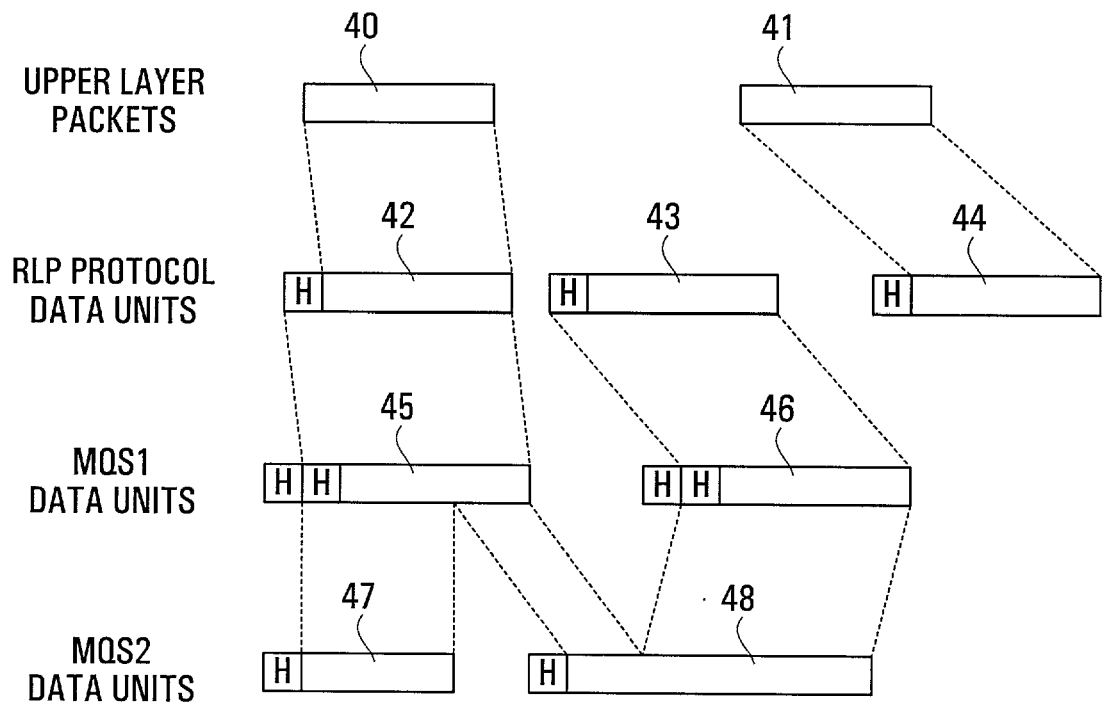
FIG. 4 is an illustration of packet segmentation and multiplexing in an embodiment of the invention.

Referring to FIG. 4, data packets from the upper layers 24 are represented at 40 and 41. As shown by dashed lines, these are encapsulated by the RLP functions 28 to form protocol data units (PDUs) 42 and 44 each including a header H. As described above, the RLP functions 28 include a Layer 2 ARQ protocol in accordance with which data may be retransmitted; a PDU comprising retransmitted data is represented at 43. As also shown by dashed lines, the RLP PDUs 42 and 43 are mapped into MQS1 (i.e. shared transport channel) data units 45 and 46 respectively, each with an additional transport channel header H. The same applies to other RLP PDUs, such as the PDU 44, although this is not shown in FIG. 4.

The lower part of FIG. 4 illustrates, again using dashed lines, the segmentation and multiplexing of the contents of the MQS1 or shared transport channel data units into MQS2 or shared physical channel data units 47 and 48, in accordance with the scheduling and mapping provided by the MQS2 32. As illustrated in FIG. 4, a first part of the contents of the data unit 45 is mapped into a MQS2 data unit 47 having a shared physical channel header H, and a final part of the contents of the data unit 45 is mapped into an initial part of a MQS2 data unit 48 also having a shared physical channel header H, the data unit 47 thereby being segmented or divided between the MQS2 data units 47 and 48. The contents of the data unit 46 are mapped into the remainder of the MQS2 data unit 48, which consequently contains multiplexed data from the data units 45 and 46. The sizes of the data units 47 and 48 are determined for the shared channels by the MQS2 32 in accordance with the fast scheduling and adaptive coding and/or modulation of data for these channels.

In the above description with reference to FIG. 4, the MQS2 or shared physical channel data units are assembled by the MQS2 32 function. It can be appreciated that, alternatively and equivalently, these shared physical channel data units can be assembled by the MQS1 30 function, in accordance with size information for the data units provided by the MQS2 32, and supplied from the MQS1 30 to the MQS2 32. For example, an interface primitive sent from the MQS2 32 can indicate to the MQS1 30 an availability for a data unit of a specified size, the MQS1 30 can assemble a data unit of this size using information from a logical channel which is mapped to the shared physical channel, and the MQS1 30 can supply an interface primitive conveying this data unit to the MQS2 32.

It can also be appreciated that, whether the shared physical channel data units are assembled as part of the MQS1 30 or as part of the MQS2 32, interface primitives between these functions, such as the availability and data supply interface primitives referred to above, provide a data flow control mechanism for RLP data which is not delay sensitive and is mapped to a shared physical channel. Thus on receipt of an availability primitive, for example sent by the MQS2 32 when a data buffer is filled to less than a desired threshold, the MQS1 30 can request RLP data frames to be delivered to it, and can supply these data frames to the MQS2 32 when they are received (and optionally assembled).

It can be appreciated that, because the MQS1 30 may typically be provided in the BSC 10, whereas data for a shared physical channel is supplied by a BS 12 on a time slot basis, it is desirable for this data flow control mechanism to ensure that data for the shared physical channel is available at the BS 12 whenever the shared physical channel is available for such data, without incurring a delay required for the BS 12 to obtain the data from the BSC 10. Buffering, at the MQS2, of the data for the shared physical channel facilitates this. (Alternatively, if this delay is small enough that buffering of data at the MQS2 32 is not required, then the MQS2 can request data from the MQS1 in real time for the respective connected service instances as the data is scheduled for transmission on the shared physical channel.) Further, it can be appreciated that the interface primitives between the MQS1 30 and the MQS2 32, which control the flow of data between these functions, are not present in the prior art in which there is a single Mux and QoS sublayer.

More particularly, in an embodiment of the invention, whenever the MQS2 32 is able to accept more data (e.g. its data buffer is filled to less than the threshold value) from a connected service instance for which data is communicated using the shared physical channel, the MQS2 32 sends an availability indication interface primitive to the MQS1 30, with parameters identifying the service instance and a maximum amount of data that can be accommodated by the MQS2. Upon receiving this availability indication, the MQS1 30 requests the corresponding data from the service instance (one of the RLP functions 28). Upon receiving the data from the respective RLP function 28, the MQS1 30 a data interface primitive to the MQS2 32, containing this data with other parameters such as the service instance identification, data size, and, for example, an amount of data pending in a buffer of the connected service instance. Upon receiving the data interface primitive with data for the shared physical channel, the MQS2 32 stores the data in its buffer pending scheduling for transmission via the shared physical channel, and supplies an interface primitive to the MQS1 30 to acknowledge receipt of this data. Upon receiving an interface primitive from the physical layer 20 indicating that it is ready to receive data on the shared physical channel, the MQS2 32 determines the connected service instance for which data should be sent on the shared physical channel in accordance with relative priorities for this data (scheduling), obtains the relevant data from its buffer, and delivers a data interface primitive to the physical layer containing an assembled data unit for transmission by the physical layer 20. As described above, the data units can be assembled by the MQS2 32 or by the MQS1 30 function.

In the arrangement of FIG. 2, the interface primitives between the MQS1 30 and the MQS2 32 can also include a parameter in each case identifying the channel type. If the channel type identifies the shared physical channel, the data flow control mechanism can operate as described immediately above. If the channel type identifies one of the common or dedicated channels for which the MQS2 32 provides a pass-through function, the data units for the physical layer 20 are assembled by the MQS1 30, and these are supplied from the MQS1 via the MQS2 32 to the physical layer 20 at an appropriate TDM frame offset time, the MQS1 and MQS2 operating in time synchronization with the physical layer 20.

In an embodiment of the invention as illustrated in FIG. 3, the MQS2 or shared channel control function terminates all of the physical channels associated with the operation of a shared high-rate forward link packet data channel F-PDCH. These channels include for example two forward packet data shared control channels (F-PDCCH), a reverse acknowledgement channel (R-ACKCH), and a reverse channel quality indication channel (R-CQICH). The MQS2 provides an automatic retransmission (ARQ) protocol that ensures the delivery of encoder packets from a BS to a MS by retransmitting portions of the turbo-coded encoder packets based on feedback from the MS on the R-ACKCH to indicate successful (ACK) or unsuccessful (NAK) reception and decoding of the encoder packet. The MQS2 uses two additional techniques to enhance the performance of packet data channel transmission: four independent ARQ channels are provided to permit the BS to have up to four outstanding (unacknowledged by the MS) encoder packets at any given time; and code division multiplexing is provided to permit the BS optionally to transmit encoder packets to two different MSs in two independent portions of the Walsh space at the same time.

The physical channels that are terminated in the MQS2 in this embodiment of the invention are used in the manner described below.

The F-PDCH physical layer channel carries subpackets of turbo-encoded encoder packets from the BS. The F-PDCH is time division multiplexed between different MSs, and as indicated above can also be code division multiplexed between two mobile stations concurrently (as directed by the BS).

The F-PDCCH physical layer channels carry control information to direct the MSs that are assigned to the packet data channel. Whenever a MS is assigned to the packet data channel, the MS monitors the two F-PDCCH channels. When the BS determines that subpackets of the turbo-encoded encoder packets are to be delivered to a MS, the messages on the F-PDCCHs indicate to the MS all of the information that is necessary for the decoding of the F-PDCH (e.g. MS identity, transmission starting time, encoder packet size, length of the transmission, the portion of the Walsh space to decode). When a MS detects its identity in the F-PDCCH it starts de-spreading the F-PDCH and acknowledges decoding of the F-PDCCH channels.

Following the reception and attempted decoding of the subpackets transmitted on the F-PDCH, the MS supplies to the BS on the R-ACKCH acknowledgements (ACKs) of successful transmissions and negative acknowledgements (NAKs) for unsuccessful transmissions. The MS also supplies to the BS via the R-CQICH feedback information about the received signal quality (CQI) for the forward packet data channel. This information can be used by the BS to control transmission power to the MS, determine data rate (encoder packet size and transmission duration), trigger packet data channel handoff, determine scheduling for the packet data channel, etc.

Thus it can be seen that the division of the Mux and QoS sublayer into two parts in accordance with embodiments of the invention facilitates both the time-driven operation of dedicated and common channels and the scheduling-driven operation of the shared F-PDCH or other shared physical channels.

More particularly, the MQS1 interfaces with signaling link access control, service-specific instances (e.g. RLP, voice), and the MQS2. It performs mapping and multiplexing of information from the signaling, voice, and data service instances for a particular MS to the various physical channels available to the MS. For information mapped to a particular dedicated physical channel, the MQS1 combines this information to form physical layer service data units (SDUs) for transmission on that dedicated channel, and delivers these to the MQS2 for pass-through or directly to the physical layer. For information mapped to the F-PDCH, the MQS1 delivers the information to the MQS2.

The MQS2 interfaces with the MQS1 and the physical layer. For physical layer SDUs sent by the MQS1, the MQS2 provides a pass-through of the information directly to the corresponding physical layer channel. For information sent from the MQS1 which is mapped to the F-PDCH, the MQS2 selects and multiplexes the information for one of the MSs for each scheduling instance, and forms the physical layer SDU for the F-PDCH for transmission to the physical layer. Alternatively, as discussed above, the information for the physical layer SDU for the F-PDCH can be assembled in the MQS1.

Although the above description relates to shared channels for communicating information via the forward link from the BSs 12 to the MSs 14, it can be appreciated that the same principles are also applicable for the communication of information via shared channels in the opposite direction.

Thus although particular embodiments of the invention and variations have been described above, it can be appreciated that numerous modifications, variations, and adaptations may be made within the scope of the invention as defined in the claims.

The invention claimed is:

1. A method of mapping information, in a wireless communications system, between logical channels for communications services and physical channels of the wireless communications system, the physical channels including at least one shared channel for communications with each of a plurality of terminals in a time division multiplexed (TDM) manner, and dedicated channels each assigned to a respective terminal for a relatively long period, the method comprising the steps of:

for information of the logical channels relating to the dedicated channels, mapping the information between the logical channels and the respective dedicated channels in a first multiplexing sublayer of a medium access control (MAC) function; and for information of the logical channels relating to the shared channels, mapping the information between the logical channels and a shared transport channel in said first multiplexing sublayer of the MAC function, and mapping the information between the shared transport channel and the shared physical channel only in a second multiplexing sublayer of the MAC function.

2. A method as claimed in claim 1 wherein the step of mapping the information between the shared transport channel and the shared physical channel in the second multiplexing sublayer of the MAC function comprises determining a size of a data unit for communication of said information on the shared physical channel, the method further comprising the step of segmenting and/or multiplexing said information in accordance with the determined data unit size.

3. A method as claimed in claim 2 wherein the step of segmenting and/or multiplexing said information is carried out in the second multiplexing sublayer of the MAC function.

4. A method as claimed in claim 2 and further comprising the step of communicating the determined data unit size from the second multiplexing sublayer to the first multiplexing sublayer, wherein the step of segmenting and/or multiplexing said information is carried out in the first multiplexing sublayer of the MAC function.

5. A method as claimed in claim 1 wherein the step of mapping the information in the second multiplexing sublayer of the MAC function comprises scheduling said information for communication in respective TDM time slots with respective terminals.

6. A method as claimed in claim 1 wherein the step of mapping the information in the second multiplexing sublayer of the MAC function comprises determining adaptive modulation and/or coding of said information in respective TDM time slots, in dependence upon channel quality feedback information from the respective terminals.

7. A method as claimed in claim 1 wherein the step of mapping the information in the second multiplexing sublayer of the MAC function comprises automatic retransmission of said information in respective time slots in dependence upon acknowledgement information from the respective terminals.

8. A method as claimed in claim 1 wherein the physical channels include a shared packet data channel and at least one shared control channel, the method further comprising the step of providing, from the second multiplexing sublayer of the MAC function, in respective TDM time slots of the shared control channel, information for a respective terminal to decode said information in a corresponding time slot of the shared packet data channel.

9. A method as claimed in claim 1 wherein the first multiplexing sublayer of the MAC function is provided in a base station controller of the wireless communications system.

10. A method as claimed in claim 1 wherein the second multiplexing sublayer of the MAC function is distributed among a plurality of base stations of the wireless communications system.

11. In a wireless communications system providing a plurality of channels for communication of information on a forward link from at least one base station to a mobile station (MS), said channels including a time division multiplexed (TDM) packet data channel for communications in different TDM time slots with respective MSs whereby the TDM packet data channel is shared for a plurality of MSs, and dedicated channels for communication of information in a dedicated manner each to a MS assigned to the dedicated channel, a method of mapping information between logical channels for communications services and said communications channels, the method comprising the steps of:

in a first medium access control (MAC) multiplexing sublayer, mapping information of the logical channels to the communications channels in accordance with the respective communications services of the logical channels; and in a second MAC multiplexing sublayer only, mapping information, which is mapped to the shared packet data channel in the first MAC multiplexing sublayer, to respective data units for communication in respective TDM time slots of the TDM packet data channel.

12. A method as claimed in claim 11 wherein the step of mapping information in the second multiplexing sublayer comprises determining adaptive modulation and/or coding of said information in respective TDM time slots, in dependence upon channel quality feedback information from the respective terminals.

13. A method as claimed in claim 11 wherein the step of mapping information in the second multiplexing sublayer comprises automatic retransmission of said information in respective TDM time slots in dependence upon acknowledgement information from the respective terminals.

14. A method as claimed in claim 11 wherein the communications channels include a shared packet data control channel and the second MAC multiplexing sublayer provides, in respective TDM time slots of the shared packet data control channel, information for a respective terminal to decode said information in a corresponding TDM time slot of the shared packet data channel.

15. A method as claimed in claim 11 wherein the first MAC multiplexing sublayer is provided in a base station controller of the wireless communications system.

16. A method as claimed in claim 11 wherein the second MAC multiplexing sublayer is provided in each of a plurality of base stations of the wireless communications system.

17. A wireless communications system comprising a base station controller (BSC), a plurality of base stations (BSs) for communication with the BSC, and a plurality of terminals for communication with the BSs via wireless communications channels including a time division multiplexed (TDM) packet data channel for communications in different TDM time slots from a BS to respective terminals, and dedicated channels for communication of information from a BS in a dedicated manner each to a MS assigned to the dedicated channel, the system including apparatus for mapping information between logical channels for communications services and the wireless communications channels, the apparatus comprising a first medium access control (MAC) multiplexing function arranged to map information of the logical channels to the wireless communications channels in accordance with the respective communications services of the logical channels; and in a second MAC multiplexing function only, the second MAC multiplexing function arranged to map information, which is mapped to the TDM packet data channel in the first MAC multiplexing function, to respective data units for communication in respective TDM time slots of the packet data channel.

18. A system as claimed in claim 17 wherein the second MAC multiplexing function is arranged to determine adaptive modulation and/or coding of said information in respective TDM time slots, in dependence upon channel quality feedback information from the respective terminals.

19. A system as claimed in claim 17 wherein the second MAC multiplexing function is arranged for automatic retransmission of said information in respective TDM time slots in dependence upon acknowledgement information from the respective terminals.

20. A system as claimed in claim 17 wherein the communications channels include a packet data control channel and the second MAC multiplexing function is arranged to provide, in respective TDM time slots of the packet data control channel, information for a respective terminal to decode said information in a corresponding TDM time slot of the packet data channel.

21. A system as claimed in claim 17 wherein the first MAC multiplexing function is provided in the BSC.

22. A system as claimed in claim 17 wherein the second MAC multiplexing function is provided in each of a plurality of BSs.

23. A base station arranged for operation in a wireless communications system as claimed in claim 17.

* * * * *

UNITED STATES PATENT AND TRADEMARK OFFICE
CERTIFICATE OF CORRECTION

PATENT NO.       : 7,436,857 B2
APPLICATION NO.  : 10/179283
DATED            : October 14, 2008
INVENTOR(S)      : Mo-Han Fong et al.

It is certified that error appears in the above-identified patent and that said Letters Patent is hereby corrected as shown below:

Column 10, claim 4, line 44, "...and]or..." should be --...and/or...--.

Signed and Sealed this

Twenty-eighth Day of April, 2009

JOHN DOLL
*Acting Director of the United States Patent and Trademark Office*